Feb. 26, 1957 H. I. TURNER 2,782,758
PORTABLE CONCRETE FARROWING HOUSE
Filed March 17, 1954 3 Sheets-Sheet 1
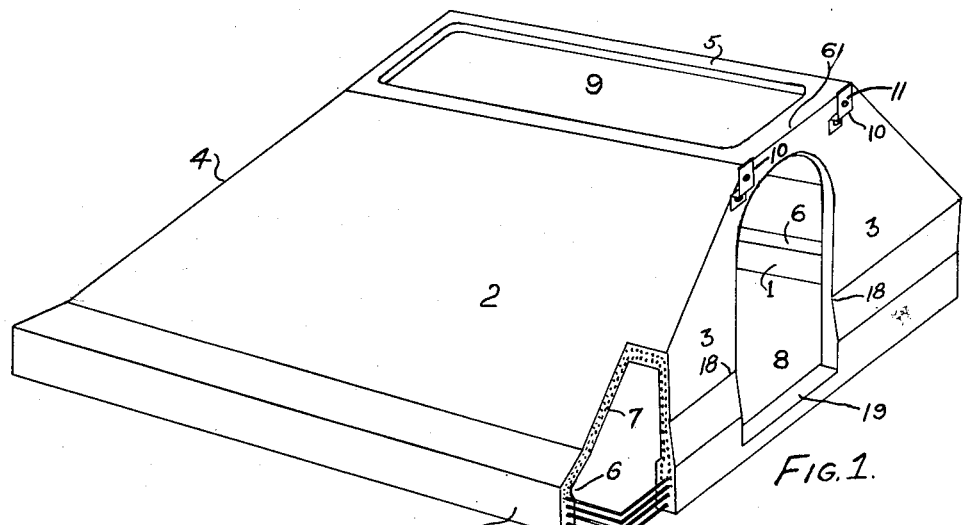
FIG. 1.
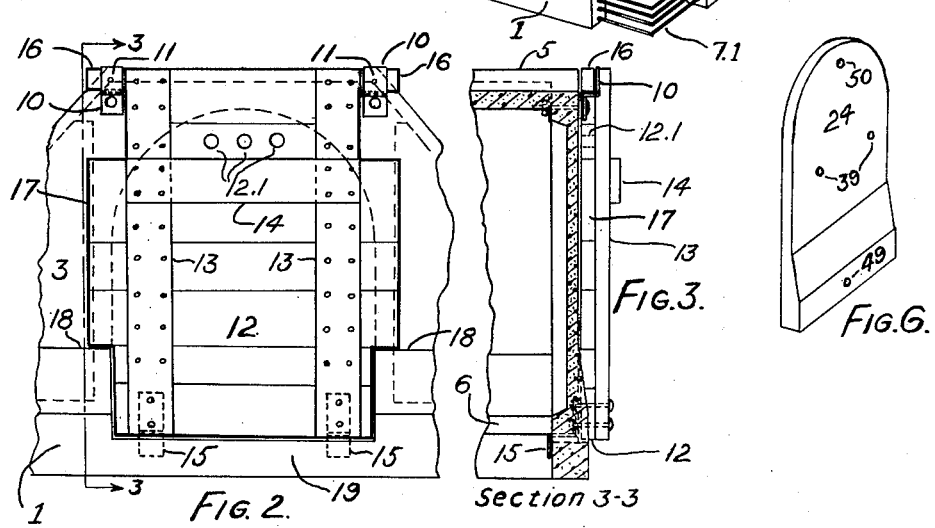
FIG. 2. FIG. 3. Section 3-3
FIG. 6.
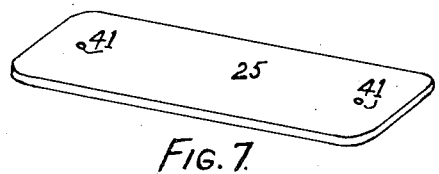
FIG. 7.
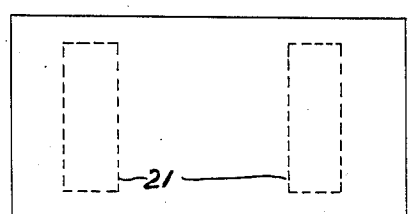
FIG. 4.
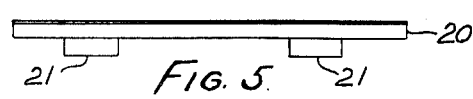
FIG. 5.
Harrison I. Turner INVENTOR.
BY Bush & Bush,
His Attorneys.

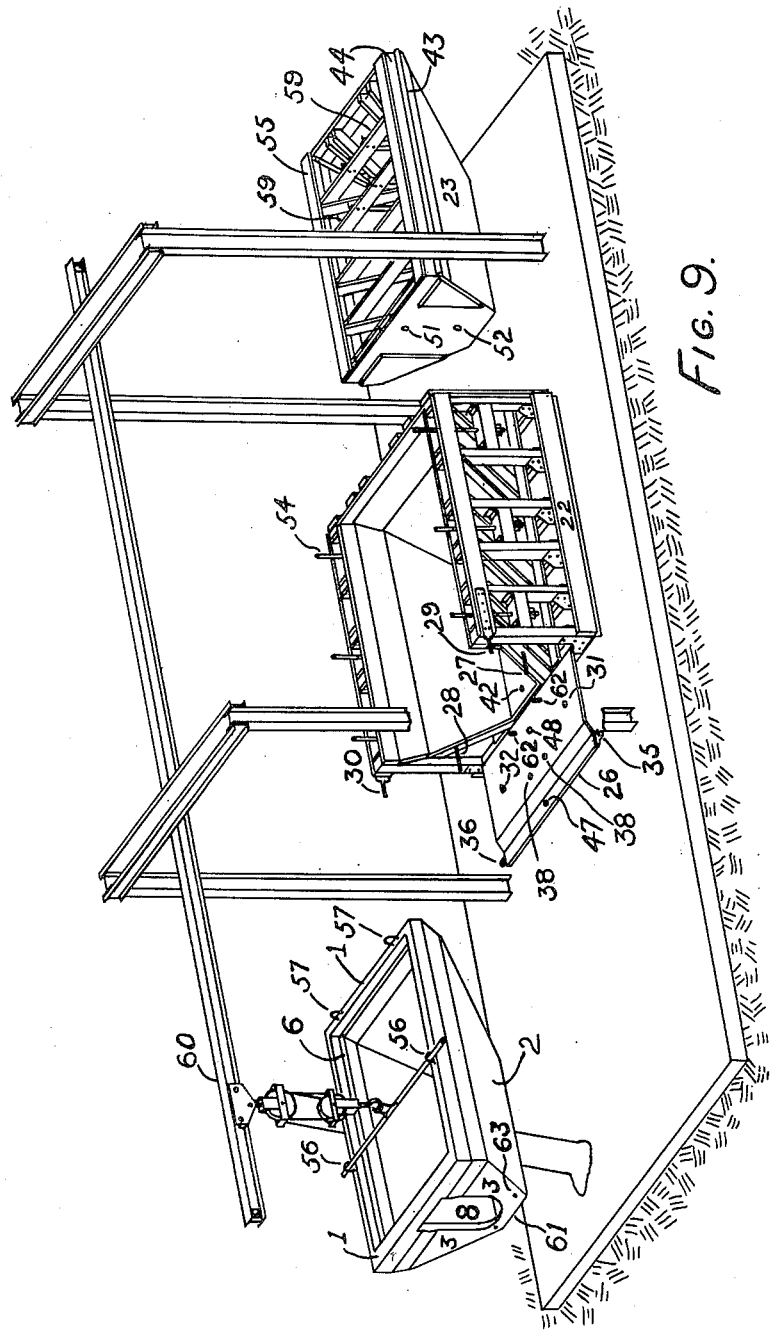

United States Patent Office 2,782,758
Patented Feb. 26, 1957

2,782,758

PORTABLE CONCRETE FARROWING HOUSE

Harrison I. Turner, Cordova, Ill.

Application March 17, 1954, Serial No. 416,825

12 Claims. (Cl. 119—19)

My invention relates to an article of manufacture being a portable reinforced concrete structure for housing livestock and especially swine.

A widely employed type of shelter for swine is commonly referred to as an "A type hog house" or a "modified A type house." Such houses are used in large numbers to house one sow and her litter and are constructed with a cross section shaped like the letter A or, if of the modified type, like the letter A but with a flat instead of a sharp top.

In general the common wooden A type hog house has proved useful, but lacking in certain important features. The life of such a house is relatively short due to the rotting of the wood and rusting of nails. Often repairs are impracticable after six or seven years of service. Repairs are time consuming and expensive. Even when houses are in a good state of repair, rain and snow often enter through joints between boards. The mother sow, when moving around inside, frequently exerts pressure against the sides which pushes boards loose from sills and frames. Doors hung on hinges are often useless because hinges rust or become detached. The usual A shape house allows the sow to walk or lie so close to the interior sides as to squeeze and kill little pigs between her and the side wall. In high winds, due to their light weight, it is not uncommon for the houses to be tumbled over and over until ruined or stopped by a fence. Depreciation expense on wooden A type houses constitutes a serious burden for the swine producer and may in many instances amount to as much as five percent of the value of swine raised in them.

The purpose of my present invention is to provide a structure free of the shortcomings just mentioned and especially to minimize the cost of shelter for swine by greatly augmenting the useful life of a hog house without adding appreciably to initial cost. Another object is to provide a structure which may be quickly repaired by the application to a damaged area of a small amount of cement mortar with a trowel. Another object is to provide without excessive cost a structure which will be amply strong over long periods of use to withstand forces swine can exert upon it. Still another object is to provide a housing so shaped that a mature hog cannot readily squeeze a young pig between herself and the interior wall. Still another object is to substitute slidable supporting means for a door in lieu of hinges, in order that the hinge nuisance may be avoided and the door readily removed and stored under cover during periods when a door is not needed.

Still another object of this invention is to provide a hog house which in the interests of economy, uniformity, and interchangeability of parts may be manufactured by unskilled personnel in a form capable of long repeated use.

Finally an object of this invention is to provide the foregoing features in a structure which is amply heavy to withstand high winds and yet may be moved conveniently from place to place around a farm with facilities commonly available on an average farm.

With the stated objects and others in view, I will now describe my invention and one practical method by which it may be produced.

Figure 1 is a perspective view of the principal element of a structure constructed in accordance with my invention, with one corner cut away to disclose reinforcing bars;

Figure 2 is an enlarged front view of the hog house door installed in place on a portion of the front wall of the house;

Figure 3 is a section taken on line 3—3 of Figure 2;

Figures 4 and 5 are top and side views respectively of the cover for the top opening;

Figure 6 shows an insert by which the door opening may be formed;

Figure 7 shows an insert by which an opening in the top or roof may be formed;

Figure 9 shows the principal members on a reduced scale of typical equipment for the manufacture of the hog house making up my invention.

Figure 8:
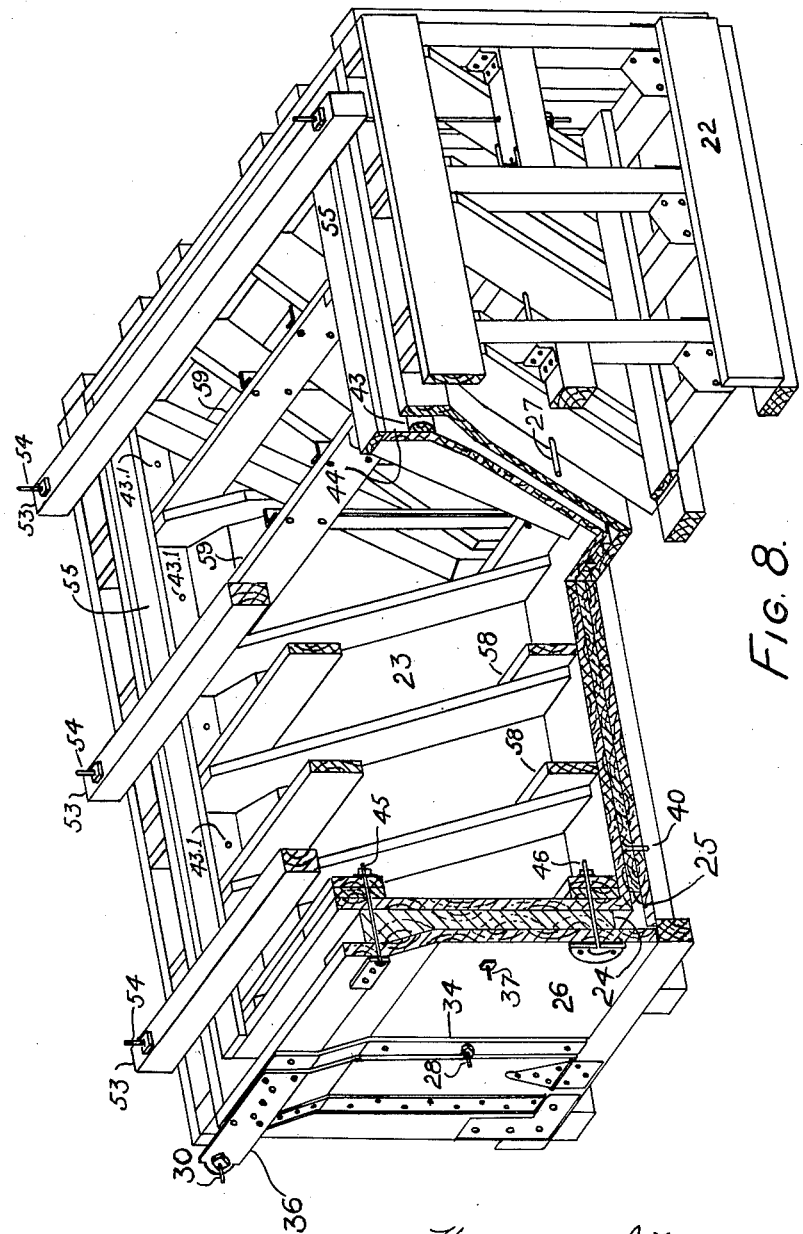
Figure 8 shows the interior and exterior forms with inserts assembled, ready for the pouring of concrete, but without the reinforcing steel in place, a corner section taken on the longitudinal and transverse center lines having been cut away.

Figure 1 illustrates the main element of my invention hereinafter referred to as the casting. This casting includes a single reinforced concrete member having sills 1, side plates 2, front 3, rear plate 4, and top plate 5. A groove 6 formed by a removable half round rod, is provided at the junction of the side and rear plates with sills as a means of reducing weight by avoiding the use of unneeded concrete. In the description which follows, the sill will be assumed to consist of that part of the structure below the level of the upper edge of groove 6 and the front, side and rear plates will be assumed to consist of that part of the casting above the level of the groove 6.

In the construction of a movable concrete hog house adequate interior space and strength must not be sacrificed to render the structure of sufficiently light weight to make practical frequent moving from location to location on a farm. Pasture rotations and sanitation require convenient portability. The size of brood sows makes impracticable the use of an individual hog house appreciably smaller than one having floor space six and one-half feet square. Likewise, of vital importance is the requirement that size limitations must not increase unduly the chance of crowding the sow and her litter thereby causing high pig death losses by crushing. An important novel feature of this present invention is the incorporation into a single structure of adequate floor space, protection of pigs against crushing by the sow, weight sufficiently low to permit transportation with ease but with good wind resistance, and durability far greater than that of earlier types of hog houses.

It has long been known that sharply sloping interior walls of a hog house may provide an area at about ground level, from which the body of the sow is excluded, and where little pigs will go to be out of danger of being crushed. In the common A type house, construction labor and material costs, as well as opportunities for the admission of rain and snow, are increased when the steepness of the sides is lessened enough to minimize danger to the little pigs. In a less common type, sloping of the rear still further increases cost and with it maintenance problems. In the case of a cast or molded structure, as covered by my invention, not only do the sharply sloping sides and rear provide safe space for the little pigs, but they likewise result in a reduction in the amount of material employed in construction with a consequent reduction in weight and easier removal from the form.

Since excessive weight must be avoided if a concrete hog house is to be readily portable, thin walls are essential and yet strength must not be sacrificed. In one method of constructing hog houses in accordance with my invention, I utilize at least two layers of wire mesh 7 (see Figure 1) throughout and depend merely upon the crimping, irregularities, and spring effects of the wires to position nearly all of the mesh well inside, instead of at the surface of, the thin walls. The result, aided by the strengthening effects due to the general shape of the structure, is a strong wall one inch or less in thickness which by test has proved more than amply strong. More precise positioning of the reinforcing mesh by one of various methods well known to those familiar with such matters may be practiced, but is not required to provide adequate strength.

When moving the hog house from place to place, it has been found most practicable to raise one bottom edge of the house, place an ordinary farm skid beneath the middle, and lower the raised edge, allowing the skid to carry the weight of the structure. A small tractor can easily tow the skid with its load. While the edge of the structure can be raised by means of a crowbar and blocks, one man can more quickly and easily place the structure on the skid by lifting with an hydraulically operated tractor-type manure loader such as is commonly found on farms. All that is required is to force the prongs or fork of the loader under one edge and raise the side by hydraulic means. However, the hog house may be slid from place to place along the ground without elevating the sills from the ground, especially if the area of the sill in contact with the ground is increased.

In order that the sills may be amply strong for forces imposed during raising and transportation, the sills are reinforced by steel bars 7.1. Experience has proved that two three-eighth inch diameter deformed steel reinforcing bars in side and rear sills are adequate, provided that each bar is extended around and beyond the corner for several inches, thereby providing four bars to resist any tendency to break at corners. In the front sill, in addition to two bars such as are provided at the side and rear, two extra ⅜" diameter bars are installed below the door opening and extended about ten inches on each side beyond the door opening.

The door opening 8 is further reinforced by one ⅜" diameter bar installed entirely around the opening about one half inch inside the concrete from the edge of the opening. The edges of cover opening 9 in the top are preferably reinforced by either one ⅜" steel bar or two or three strands of heavy steel wire surrounding the opening. The bars or wire reinforcing the door and cover openings are preferably bound in position to the edge of the reinforcing mesh by soft steel wire. Neither of these reinforcements is illustrated, since the foregoing explains their nature and position. Normally, no closure of door opening is needed, but said opening must at times be closed either to protect the swine from violent weather or to confine them in a space where they can readily be caught for medical treatment, marking, or castration. When only protection from the cold is required, a sheet of canvas suspended from a wooden bar resting in clips 10 suffices and prevents neither egress nor ingress. A screw or nail driven through each hole 11 into said wooden bar will hold the bar in place. If egress or ingress is to be prevented, a wooden door 12 as shown in Figures 2 and 3 serves the purpose and at other times may be stored under cover for preservation. Holes 12.1 are for ventilation. The door 12 consists of several horizontal boards held together by vertical strips 13, a handle strip 14, and bolts passing through two strap iron members 15. At the top of the door a portion of the horizontal board 16 extends on each side beyond the boards beneath it and rests in clips or brackets 10. A few inches below the shorter board or boards, several boards 17 of the same length as the longer part of top board 16 are provided and extend an inch more or less beyond each side of door opening 8. Below point 18 where the outer surface of the front wall of the house starts to slope outward, boards slightly shorter than the width of opening 8 are employed to close the opening down to door sill 19. At the bottom of the door and extending across and then down behind the sill 19 are the two strap iron members 15 bolted to the bottom door board and to the strips 13. It will readily be observed that door 12 when closed is held against outward movement by clips 10 at the top and strap iron members 15 at the rear of the sill at the bottom. Likewise, door 12 is held against inward movement by the longer boards 17 resting against the front of the hog house. Finally, sidewise motion is prevented at the top by clips 10 and at the bottom by the edge of the sloping surface below the level of point 18. To prevent a swine from attempting to raise the door, a screw or nail may be inserted through hole 11 in each clip 10. The door may be conveniently lifted or pushed downward by applying the required force to handle strip 14.

For ventilation and access to pigs when confined, opening 9 is provided. To close opening 9, a cover 20 is provided. Said cover consists merely of several long boards fastened together by two cleats 21 as shown in Figures 4 and 5 and covered by a protective rain tight cover of roofing material. Cleats 21 are so proportioned and located that when the cover is placed on top of the hog house the cleats will rest within opening 9 and obstruct forward, backward, or sidewise motion of the cover.

Having now described my invention, I will explain the equipment and the procedure employed in its construction. Referring to Figures 8 and 9, the principal items employed in construction consist of an outside form 22, inside form 23, an insert 24 for forming the door opening, an insert 25 for forming the opening in the top, and various common items of hoisting equipment readily recognizable in Figure 9.

The inside and outside forms as illustrated are substantially constructed of wood and the surfaces to contact the concrete are lined with sheet metal. A form fabricated of steel structural materials and plates welded to required shape is equally suitable and more durable. The metal lined surface of the outside form 22 must be shaped substantially in the same form as the exterior surface of the hog house. Correspondingly, the metal covered surface of inside form 23 must be shaped the same as the interior surface of the hog house. Inserts may be attached to either form, or protrude from either, to provide holes or openings or to reduce weight as may be needed for various purposes.

Because the interior form 23 must be withdrawn from the finished casting and because the finished casting must be withdrawn from the outer form 22, it is required that the steel lining of each form be well lubricated before the concrete is poured and there should be substantial draft on all surfaces including those of sills and inserts in contact with the concrete similar to that required of a pattern employed in shaping sand molds in foundry processes.

The procedure employed in molding the concrete hog house may be as follows:

Door 26 of outer form 22 hinged at its lower edge is clamped shut in a vertical position by means of holding bolts 27, 28, 29 and 30. Bolts 27 and 28 are securely held in form 22 and pass through holes 31 and 32 respectively and channel bars 33 (not shown) and 34, so that, when door 26 is in a vertical position and nuts tightened against channel bars 33 and 34, the force applied by bolts 27 and 28 is well distributed across the entire door. To further secure the door 26 in position, bolts 29 and 30 pass through plates 35 and 36 respectively and the tightening of nuts on bolts 29 and 30 clamps the top edge of the door firmly against the main part of the form. Insert 24 with its side having the sloping surface next to the door 26 is then clamped to the door by bolts 37 which pass through holes 38 in door 26 and holes 93 in insert 24 and the heads of which bolts are countersunk into the flat side of insert 24, so that they do not extend outward of said surface. Insert 25 is next positioned in the bottom of form 22 by dowels 40 passing through holes 41 and matching holes 42 in form 22. The wire mesh reinforcing, if it has not previously been fabricated to shape, is now cut to size and laid against the entire inner surface of form 22 except where inserts 24 and 25 are located. To insure adequate strength, at least two layers of the mesh are best employed and different strips of the mesh should overlap each other liberally to allow the strips to be tied together by soft steel wire to form a complete rather rigid basket-like structure. Entirely around insert 24, a ⅜" diameter reinforcing bar, previously bent to shape, is tied by soft steel wire to the basket-like mesh structure and similarly entirely around insert 25 a single reinforcing bar previously bent to shape is tied to the mesh structure. There has now been constructed a reinforcing structure sufficiently rigid to permit its being hoisted without injury out of form 22, which operation is next accomplished, to permit final cleaning of the interior surface of form 22 and the application of a suitable oil to prevent concrete from adhering to the metal lining of form 22.

Next, half round inserts 43 are attached by screws 43.1 passing through still forming surfaces 44 of form 23 into the inserts, the heads of the screws being on the inside of form 23 so that the screws may later be removed while form 23 is embedded in the solidified concrete of the casting. Oil is next applied to the interior of form 22, the reinforcing mesh basket-like structure lowered into place in form 22, oil is applied to the exterior of form 23 and form 23 is lowered into form 22. With form 23 resting inside form 22, it is necessary to clamp form 23 in its forward position by two bolts 45 and 46 passing through holes 47 and 48 of door 26, and through matching holes 49 and 50 in insert 24 and holes 51 and 52 in the front surface of form 23. Finally, form 23 is clamped against vertical motion by three strong beams 53 extending between hold-down bolts 54 across the top of forms 22 and 23 and exerting a powerful downward force against boards 55 provided by nuts applied to bolts 54. It will be apparent that the pouring of concrete between the outer and inner forms will develop a very strong buoyant force against form 23 and the downward force exerted by the beams 53 must be adequate to prevent any actual rise of form 23.

From Figure 9 it will be noted that the casting is molded in an inverted position. This is done partly because the space between the inner and outer forms where the sill is molded is sufficiently wide to facilitate pouring of the concrete into the space. Also, since the top and walls of the hog house are thin, it is desirable that there be ample hydrostatic head forcing the concrete into the space between the forms. Finally, the steel bars by which the sill is reinforced may be conveniently fastened in position by hanging them with iron wire from beams 53.

In order that the casting after solidifying may readily be lifted out of the form, two wire loops 56, Figure 9, are installed approximately in line with the center of gravity of the casting and these loops for convenience, especially when lifting the basket-like mesh form as previously mentioned, are best extended down to and attached to the mesh. Similarly, for use when inverting the solidified casing, as will later be explained, two other loops 57 are installed in the sill at the rear. These four loops are cut off after inversion has been accomplished.

To assist the free flow of the fluid concrete into all parts of the space between the inner and outer forms, to improve its bond to the reinforcing, and to increase the strength of the concrete by allowing any excess water to work its way to the top of the forms, it is desirable to employ a means of keeping the forms and the fluid concrete in a state of tremor during pouring and for a brief period thereafter. One convenient means of accomplishing this is to clamp to brace members 58 of inside form 23 a small motor (not shown) on the shaft of which is an unbalanced weight.

With forms securely clamped together, reinforcing in place, and vibrator motor running, pouring of concrete or other suitable moldable material may be commenced. Either a rich mixture of cement, sand, and fine gravel or a mixture of light weight constituents of which many varieties are known may be utilized, but I prefer to use "highly-early-strength" cement, coarse sand, and gravel or finely crushed granite or other hard rock which will pass through a sieve having not larger than ⅜" square openings. Experience has proved that, if the concrete after pouring is maintained at a temperature of 60° F. or above, the inner form 23 may safely be hoisted out of the casting after twenty-four hours and the hog house casting itself may be hoisted out of outer form 22 after forty-eight hours.

Prior to removing inner form 23, the three holddown beams 53 must be removed, inserts 43 must be detached from form 23 by removing the respective holding screws 43.1 and bolts 45 and 46 which pass through insert 24 and the front wall of form 23 must also be withdrawn. Inner form 23 may then be lifted by attaching tackle to cross-braces 59.

The finished casting may next be removed by first removing nuts from bolts 37, withdrawing dowels 40, lowering door 26, and then hoisting the casting with the equipment illustrated in Figure 9. Inserts 24 and 25 may then be withdrawn. Finally, the finished casting must be inverted, which may be accomplished in any of numerous ways. For example, the casting may be lowered to within a foot of the ground and at that level supported at its forward end by resting it on a large block and at its rear by interposing a tackle between beam 60 and loops 57. The chain hoist may then be employed to raise the forward end by attaching, preferably by means of a special clamp, to the well reinforced portion 61 between door 8 and top opening 9. After the front end has been raised slightly the rear may be lowered to the ground and pivoted about the edge where rear wall 4 joins the rear sill. Finally, the entire casting may be raised clear of the ground by the tackle attached at point 61, tilted over center, and lowered gradually in an upright position onto a vehicle, skid, or other means of transportation. Well known means of curing and protecting the concrete may be applied to enhance its durability. Two pin inserts 62 protruding from door 26 (see Figure 9), preferably covered by thick paper tubing, serve to form the holes 63 for bolts for attaching door holding clips 10.

In the foregoing description, certain forms of reinforcing have been specified, but it should be understood that such is only by way of example and that for reinforcing purposes many materials in numerous forms and amounts will meet the requirements of my invention. Even ribbed sections of the same materials as the basic material of which the casting is made, may be considered suitable reinforcement.

If desired, a floor may be provided for the hog house in which event, the floor may best be constructed as a member separate from the casting described above.

Various modifications may be made in the size, thickness, form, proportions and materials used without departing from the spirit of my invention as expressed in the claims, and I do not limit my claims to the precise forms shown in the drawings which are not drawn to a definite scale.

In the claims I use the term "thin wall" to indicate my preferred thickness of about one inch, and the term "increased thickness of the sills" to indicate a preferred form of from four to five inches in height and of two to three inches in thickness, but these dimensions may be varied to meet the conditions of the soil on which the house is to be maintained and the various wind conditions to be expected in different localities.

The terms "sloping" and "inclined" referring to the side and rear walls, are intended to indicate a slope of approximately 45° from the horizontal, but the degree of slope may be varied to accommodate variations in the dimensions of height, width and length of the structures, and the terms "sloping" and "inclined" will be applicable to such changes as are necessary to adapt them to changes in dimensions of the structures.

I claim:

1. A portable thin-walled reinforced molded structure for housing livestock comprising a smooth substantially vertical front wall and smooth sloping side and rear walls, all united at their lower edges to a sill of increased thickness, and having a smooth flattened top, and means of ingress and egress through the front wall.

2. A housing as described in claim 1, and a vertical door removably mounted at the means of ingress.

3. A housing structure as described in claim 2, and a flattened top having an open space therein adapted to provide ventilation when desired and having a removable cover fitted to the flattened top adapted to cover and close the open space.

4. A portable reinforced concrete housing for small animals having a substantially vertical front wall with inclined thin rear and side walls a unitary sill formed integral with the front and side walls, the front wall carrying an open space as a doorway and a removable door mounted therein.

5. A portable reinforced concrete housing for small animals including a thin substantially vertical front wall with inclined thin rear and side walls united at their lower edges to a unitary sill of increased thickness extending entirely around the housing and formed integral with the side, rear and front walls, the front wall containing a doorway and the front, side and rear walls being formed integral with an integral flattened top.

6. A housing as described in claim 5, and the flattened top including a relatively large opening therein and a removable cover adapted to close the opening when in place thereon.

7. A housing as described in claim 6, all of said walls and top being reinforced by a unitary metallic mesh.

8. A housing as described in claim 6, all of said walls and top being reinforced by a unitary metallic means having rectangular openings formed throughout, said concrete being formed of mixed cement, sand, pebbles of crushed hard rock of not over ⅜ inch in diameter.

9. A housing as described in claim 8, and said mesh being formed either of a single member of metal or of a plurality of members formed and united in a single structure by soft steel wires or other suitable means.

10. A portable thin-walled reinforced molded structure for housing livestock having a flattened top, a substantially vertical front wall and sloping side and rear walls, all united at their lower edges to and integral with sill members of increased thickness, means of ingress and egress through the front wall, and a vertical door removably mounted on the front wall at the means of ingress, said door having laterally extending arms at the top thereof adapted to rest in brackets united to the front wall when in place and to be manually removable upwardly therefrom.

11. A structure as described in claim 10, said door also being provided with means at the bottom thereof adapted to engage inner side of the front sill member at the bottom of the doorway to prevent displacement thereof.

12. A structure as described in claim 10, said door also being provided with metal bars united to the bottom of the door adapted to engage the sill at the bottom of the doorway to prevent displacement thereof.

References Cited in the file of this patent

UNITED STATES PATENTS

| Number | Name | Date |
|---|---|---|
| 518,292 | Tickner et al. | Apr. 17, 1894 |
| 1,021,927 | Harrison | Apr. 2, 1912 |
| 1,060,347 | Massey | Apr. 29, 1913 |
| 1,382,265 | Beeby | June 21, 1921 |
| 1,743,603 | Heinzenreter | Jan. 14, 1930 |
| 2,201,359 | Whited | May 21, 1940 |
| 2,353,071 | Pitou | July 4, 1944 |
| 2,460,662 | Van Voorhis | Feb. 1, 1949 |
| 2,616,149 | De W. Waller | Nov. 4, 1952 |

FOREIGN PATENTS

| Number | Country | Date |
|---|---|---|
| 61,153 | Denmark | July 19, 1943 |